J. G. CHILDS.
WIND TURBINE.
APPLICATION FILED OCT. 24, 1910.
1,010,586.
Patented Dec. 5, 1911.
6 SHEETS—SHEET 4.
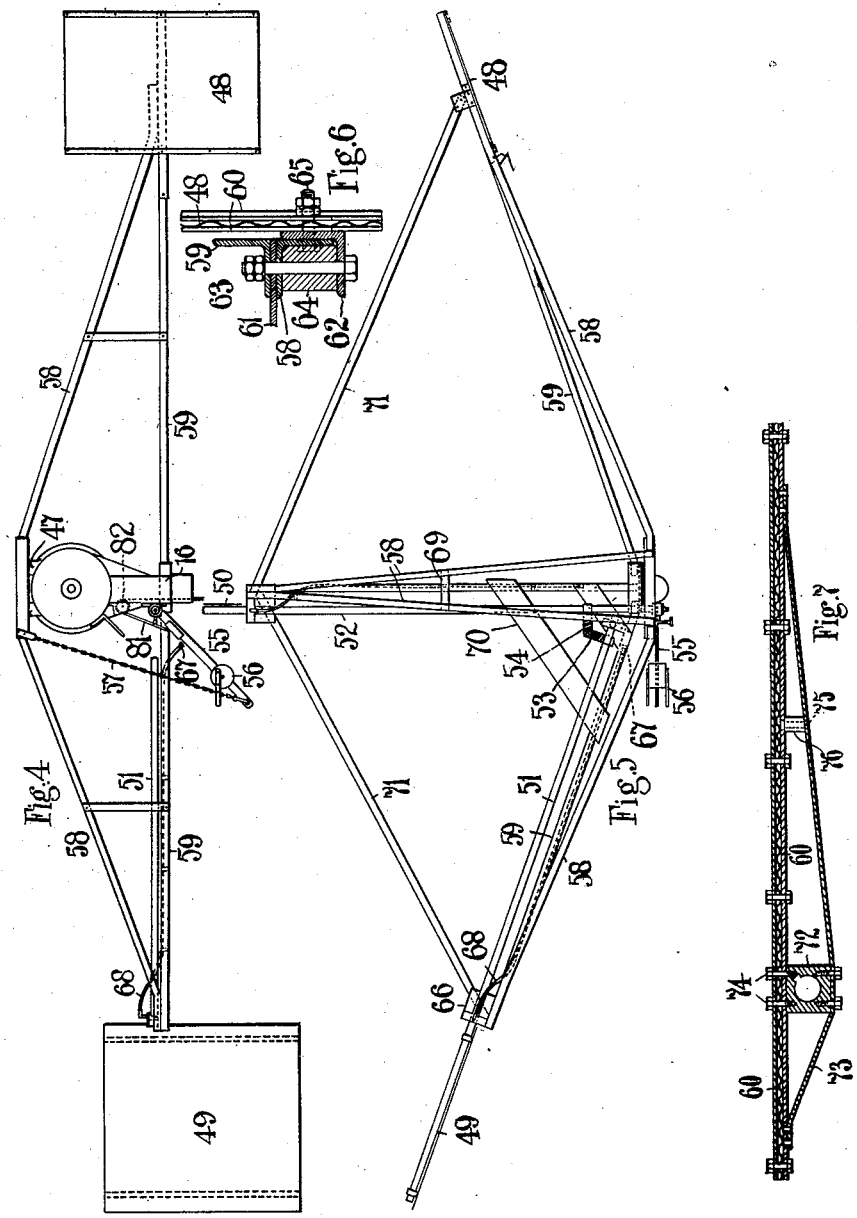
Witnesses
E. W. Moore.
L. E. Barkley.
Inventor
Joseph Gershom Childs.
per Frank I. Akkerman,
Attorney.

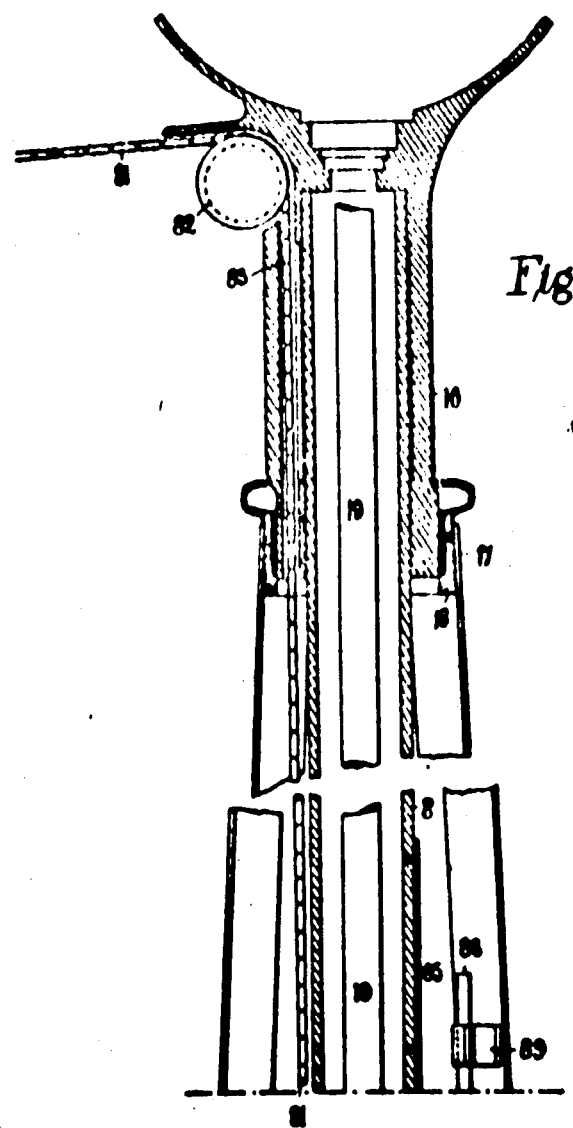

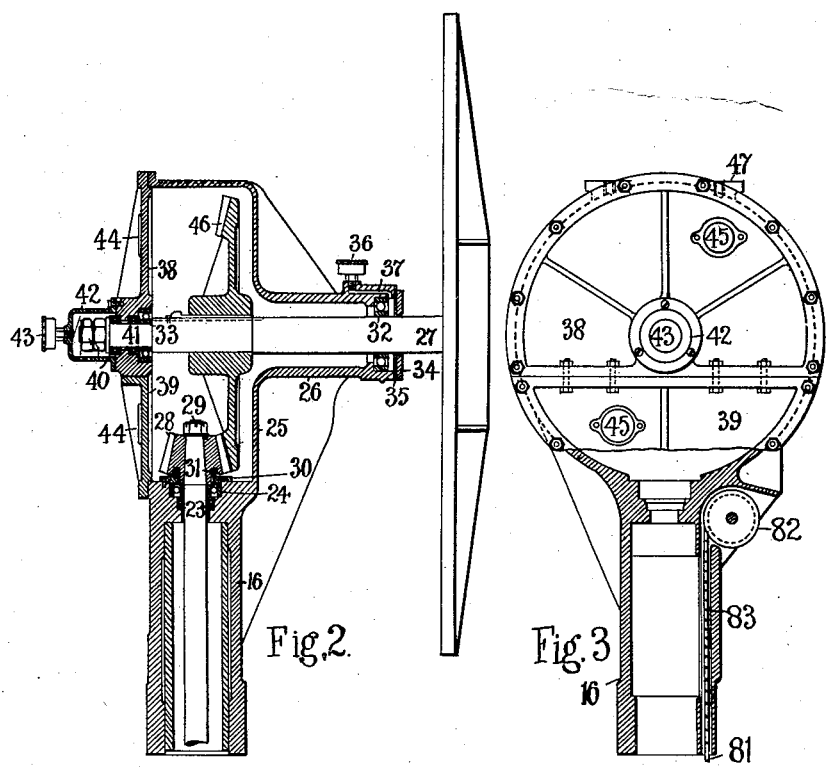

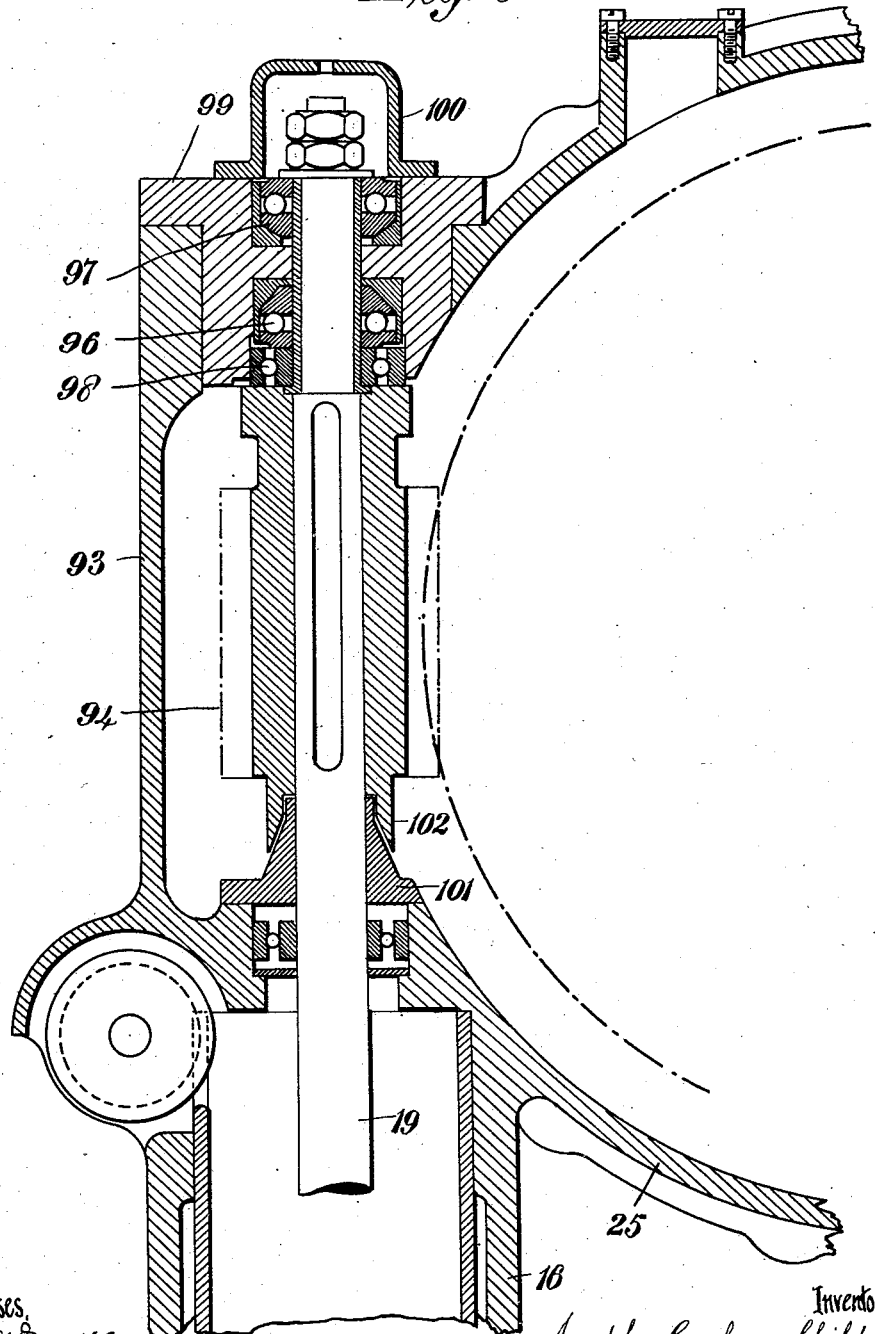

J. G. CHILDS.
WIND TURBINE.
APPLICATION FILED OCT. 24, 1910.

1,010,586.

Patented Dec. 5, 1911.
6 SHEETS—SHEET 6.

UNITED STATES PATENT OFFICE.

JOSEPH GERSHOM CHILDS, OF WILLESDEN GREEN, LONDON, ENGLAND.

WIND-TURBINE.

1,010,586. Specification of Letters Patent. Patented Dec. 5, 1911.

Application filed October 24, 1910. Serial No. 588,883.

*To all whom it may concern:*

Be it known that I, JOSEPH GERSHOM CHILDS, a subject of the King of Great Britain, residing at Hawthorn Road, Willesden Green, in the county of London, England, have invented new and useful Wind-Turbines, of which the following is a specification.

This invention relates to wind turbines, and its object is to improve the construction of such turbines so as to make them more reliable and capable of being left unattended for long periods.

More particularly defined, the invention comprises especially improvements in the supporting of the turbine head designed to withstand the considerable strains to which the structure is subjected in use.

Further the invention comprises improvements in the gearing of the turbine and the casing inclosing said gearing so that the turbine may run at high efficiency and without requiring much attention, while nevertheless repairs when necessary can be effected with facility.

Moreover the invention extends to the vanes by which the wind turbine is controlled, and is designed to strengthen these vanes and their supports so as to lessen the risk of damage due to the violence of the wind; also to enable the wind turbine to trim quickly and accurately to the wind and to govern its output.

In particular the invention designs to provide for the driving of an electrical generator from the wind turbine, the electrical system being duly safeguarded.

To facilitate the understanding of my invention I have appended hereunto illustrative drawings, in which—

Figure 1:
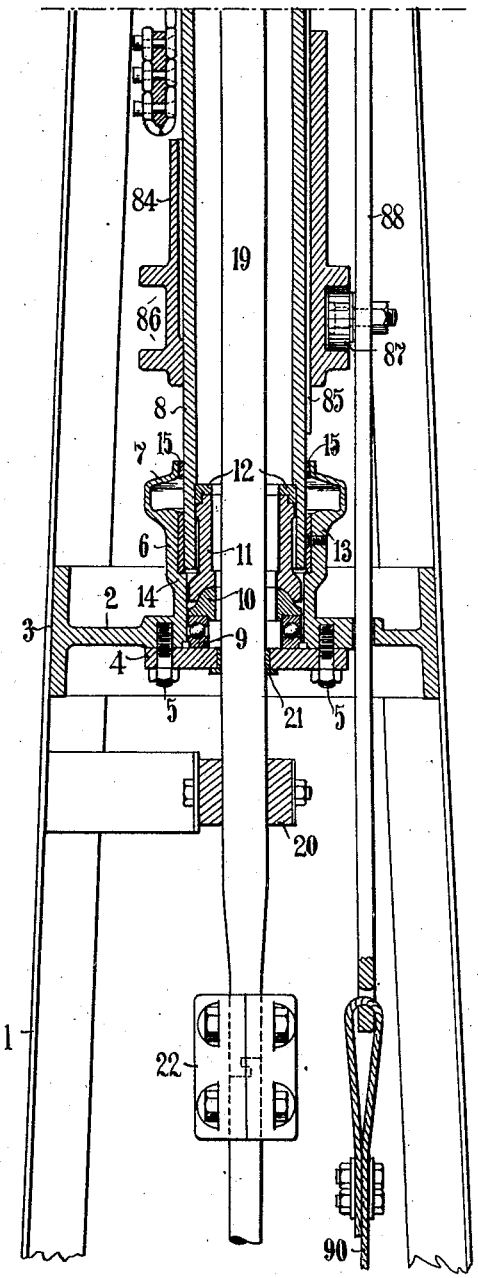
Figure 9:
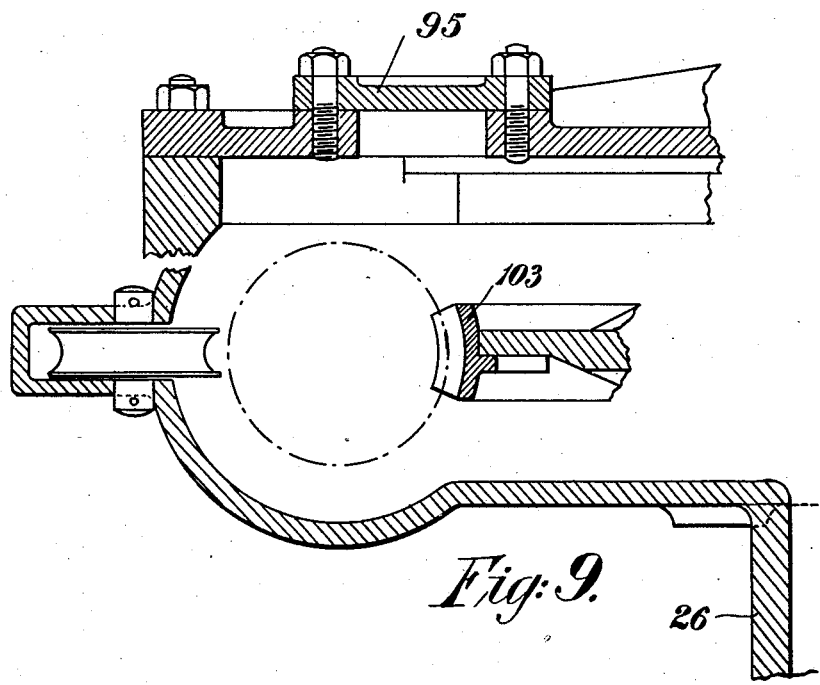

Figure 1 shows the upper part of the tower upon which the turbine head is supported. Fig. 2 is a section or elevation. Fig. 3 is an elevation partially in section of the turbine head, the turbine wheel itself and the vanes being omitted. Fig. 4 is an elevation, and Fig. 5 a plan of the controlling vanes and their supporting framework. Figs. 6 and 7 are details of the structure and fastening of said vanes. Figs. 8 and 9 illustrate an alternative form of driving mechanism in sectional, side and edge elevation respectively.

Referring first to Fig. 1, the tower upon which the turbine is supported is preferably of metal framework made as light as is consistent with strength, though there may of course be a masonry base of desired size in certain cases. 1, 1 indicate the angle or T bars forming the upper portion of the tower. These are united at a point some six feet or more from the top according to the size of the structure, by a square or other casting consisting of a central plate 2 expanded at its periphery as seen at 3, to make joint with the frame members, and having a large circular opening at its center. This opening is in part closed by a plate 4 beneath the casting, secured thereto by bolts 5. It is this plate which supports the weight of the turbine head under normal conditions. The plate 2 has a cylindrical upward extension 6 at its center, which is expanded near its top to form a recess 7 adapted to contain lubricant. As the turbine head has to rotate, it is necessary to provide a suitable bearing to form its support. To withstand the side strains to which the turbine head is subjected due to the large area exposed by it and the turbine wheel to the wind, it is necessary that this bearing shall be of considerable length. To this intent the head is mounted upon a long cylinder 8 extending from the casting 2, 3 from the top of the tower. The bearing supporting the weight of this cylinder is formed by a ball or roller thrust bearing 9 supported upon the plate 4 and itself supporting an annular piece 10 having a spherical upper surface. Upon this rests a third cylinder 11 having below a corresponding concave spherical surface, and this carries the cylinder 8 by means of the ring 12 attached thereto. Lateral bearing for the cylinder 8 at its lower end is provided by the bush 13 securing a recessed portion of the cylindrical extension 6. It is to be noted that the cylinder 8 is supported a very short distance, say one-eighth inch, above the shoulder 14 on the cylinder 6. This shoulder is intended to take the weight of cylinder 8 and the superposed head when the plate 4 is removed in order that the lower bearing may be inspected or repaired. Suitable packing 15 at the top of the extension 6 prevents access of moisture to the chamber 7.

At its upper end the cylinder 8 is surrounded by a cylindrical downward extension 16 on the casing which forms the turbine head. This extension has a lateral bearing against the bushing 17 arranged between it and a casting 18 which joins the ends of the frame members 1. This, like the casting 6, is expanded at the top to form an oil reservoir. A long bearing like this gives considerable strength against lateral stresses and the spherical surfaces of parts 10 and 11 enable the head to swing slightly on its bearing as the tower deflects.

The shaft 19 by which power is transmitted from the turbine above to the machines to be driven below, passes through the center of cylinder 8 and is guided beneath the cylinder by suitable bearings, for example the hard wood bearing 20 secured upon the frame members 1. Packing 21 fills the space between the plate 4 and the shaft. On account of its considerable length, it is generally necessary to make the shaft in sections coupled together as indicated at 22, each section being suitably guided by, for example, hard wood bearings such as 20. The weight of this shaft is taken by a bearing at the top from which, therefore, the shaft to all intents and purposes is slung. This bearing is seen in Fig. 2 at the upper part of the downward cylindrical extension 16 of the casing forming the head. It comprises a ball or rod thrust bearing 23, above which is a ball or roller journal bearing 24.

The form of the casing which constitutes the center of the turbine head, will vary according to the type of gearing used to join the turbine wheel to the vertical shaft. The preferred form of gearing is shown in Fig. 2 and consists of a pair of bevel wheels. Accordingly the casing is made up of the downward cylindrical extension 16, a flat cylindrical portion 25 having its axis horizontal, and a horizontal cylindrical extension 26 on the center of this last to carry the shaft 27 of the turbine wheel. The smaller bevel wheel 28 is secured upon shaft 19 by a nut 29 on the screwed end of said shaft, and its shoulder rests upon the bearing 23 and so supports the shaft. It will be noted that a cover plate 30 inclosing the thrust and journal bearings of shaft 19 has an upwardly extending collar 31 engaging in a corresponding recess in gear wheel 28. When the gear wheel is in rotation, this construction causes the lubricant to be flung outward, and so prevents undue leakage to the bearing below.

The shaft 27 of the turbine wheel 127 is supported in journal bearings 32 and 33. The former is arranged at the end of the cylindrical extension 26, which extension is closed by a cap 34 which fastens down a leather washer 35 against the shaft and the end of the extension so as to make a water-tight joint. A lubricator 36 oils this bearing through channel 37. Bearing 33 is formed in the plate 38, which partly closes in the cylindrical casing 25 on one side. A second plate 39 closes the bottom portion. The shaft 27 is prevented from endwise movement by thrust bearings 40 and 41 which fix it relatively to the plate 38. The bearings are inclosed by a cap 42 on which is a lubricator 43. Hand holes 44 are provided in the plates 38 and 39 and are normally closed by covers 45. The shaft 27 carries a gear wheel 46 meshing with gear wheel 28.

The structure of the casing described enables ready access to be had to the gearing for inspection or repair. The hand holes 44 allow inspection if no repair is necessary, but if more considerable access is required, the bottom plate 39 can be removed without in the least disturbing the support of the turbine wheel shaft 27.

For the attachment of the supports carrying the vane, the casing 25 is expanded into a flat top 47. This supporting frame-work, for the sake of strength, is made of two sets of radial angle bars or T bars, and joined together at their outer extremities by further frame members, giving complete rigidity. In the structure illustrated, three controlling vanes are employed, of which one projects approximately at right angles to the turbine wheel, while the other two extend on either side at an angle of about 20° with the plane of the wheel. One of these side vanes 48 is fixed to its support so as to be capable of rotation. The other side vane 49 and the central vane 50 are revoluble. They are secured upon the shafts 51 and 52 which carry segmental intermeshing gears 53, 54. On the shaft 52 is secured a lever or crank 55 and upon this is an adjustable weight 56. The end of the lever is joined by a chain 57 to a short length of angle iron secured on the expanded top 47 of the gear casing so that the motion of the lever is limited. It will be seen that the weight tends to rotate the shaft so as to bring the lever as far down as the chain will permit, and in this position the vanes 49 and 50 are fully operative.

The vane 48 which is the fixed vane is supported by two frame members 58 and 59, the former proceeding from the top and the latter from the bottom of the gear casing. These frame members are preferably angle bars. They are joined to the vane as illustrated in Fig. 6, which shows a cross section through the vane and joint. The vane proper 48 consists of ordinary galvanized corrugated iron or the like. This is stiffened by flat or angle bars 60 arranged on either side of it. Between the frame members 58 and 59 which are bent parallel at their ends, is inserted a packing plate 61. A second angle piece 62 is secured by bolts 63 to the angle bars 58 and 59 and the packing plate 61, a block 64 being interposed between the angle bars 59 and 62 to take the compression of the bolt; the bars 58 and 62 are then further joined by bolts 65 to the bars 60 on the vane. The vane itself is mounted on a short piece of angle or channel so that it can be put up after the supporting frames are fixed. Two other frame members 58, 59 serve similarly to support the vane 49. As this is a movable vane, however, it is not attached directly to the frame members but to the shaft 51 which is supported in a bearing 66. The lubricant is supplied to this bearing from the lubricator 67 through pipe 68.

The structure for supporting vane 50 is similar save that there are two top bars 58. The three supports are joined at their outer extremities by members 71 and serve to prevent twisting. Further cross-ties as 69, 70 may be employed if desired. The bar 70 is preferably formed as a platform sufficiently wide for standing on. It may of course be made of wood.

For the movable vanes a form of fastening such as indicated in Fig. 7 may be adopted. A steel block 72 is formed to fit the respective shaft and is attached to the vane by means of a strip 73 which serves also as a stay. The block is further secured to the vanes by the bolts 74 which pass through the strengthening bars 60 of the vane. A bolt or rivet 75 and a surrounding tube 76 forming a distance piece serve as a tie and strut respectively to strengthen the attachment. The blocks are keyed to the shafts and the whole makes a very rigid and light structure. The blocks may be split and clamped to the shafts.

The position of the movable vanes is controlled by means of the chain 81. This chain has of course to rotate with the turbine head but has to be operated by a stationary handle at the bottom of the tower. The connection employed to transmit the desired motion may be seen in Fig. 1. The chain 81 passes over the pulley 82 secured to the turbine head, and then through a passage 83 in the lower part of the head. At its end the chain is secured to a sleeve 84 sliding on the cylinder 8. The sleeve is prevented from turning relatively to the cylinder by a feather 85. The sleeve is formed with a groove 86 between the outstanding flanges and in this engages a roller 87 fastened upon a rod 88 which is capable of sliding vertically in the support 89. To the lower end of this rod is attached a rope or the like 90 proceeding to the operating handle at the bottom of the tower. It will be seen that the connection 86, 87 permits the sleeve 84 to turn freely while the rod 88 remains stationary, but on the other hand the vertical movement of the rod 88 is directly communicated to the sleeve and through the chain 81 to the crank 55 and shafts 52 and 51.

In some cases a worm and worm wheel gearing may be used in place of the wheels 28, 46 shown in Fig. 2. Such a transmission gear is illustrated in Fig. 8. The gear casing is of somewhat similar structure to that employed for the gear 28, 46. It has a cylindrical portion 16 surrounding the vertical shaft and a flat portion 25 which is prolonged on one side into a smaller cylinder 26 supporting the turbine shaft. To receive the worm the gear casing is provided with an approximately cylindrical extension 93 which surrounds the worm 94. A cover plate 95 permits access for inspection of the worm. As before the vertical shaft 19 is hung from a top bearing. In this connection the worm gear has an advantage inasmuch as it may be so arranged that the rotation of the worm wheel 103 tends to lift the worm and so relieve the bearings of the stress due to the weight of the shaft. At times of large output this lifting stress may even overcome the weight. It is therefore necessary to provide an upward thrust bearing 96 as well as the suspension bearings 97 and the two journal bearings 98. To provide for ready inspection of the bearings 96, 97, 98 they are formed in a separate cap block 99 fitting into the top of the cylindrical portion 93. The opening at the end of this block is again covered by the cap 100 which serves as a receptacle of grease.

It is of course necessary that the worm wheel 103 should dip into the lubricant and carry that lubricant up to the worm. In order that a considerable quantity of lubricant may be contained within the cylindrical portion 25 of the gear casing, the opening through which shaft 19 comes is covered by a conical retaining piece 101 which makes an oil tight joint with casting 93. The end of the worm is extended as seen at 102 to fit over this conical piece and the rotation of the worm tends by centrifugal action to throw off any oil that might otherwise pass between 101 and 102. By this means it is made possible to fill the casing almost half way up to the shaft with lubricant.

What I claim is:

1. In a wind turbine, the combination with a tower, of a journal bearing at the top of said tower, a casting uniting the members of said tower at some distance from the top, a journal bearing and thrust bearing supported by said casting, a tube supported by said bearings, and a turbine head surrounding said tube and entering the upper bearing.

2. In a wind turbine, the combination with a tower, of a cylinder carrying the turbine head, a casting supported below the top of the tower and having an extension protruding beneath the cylinder a short distance therefrom, a removable plate attached to said casting on its underside and a bearing for the cylinder supported by the plate.

3. In a wind turbine the combination with a supporting tower of a cylinder carrying the turbine head, a casting supported below the top of the tower and carrying a bearing for said cylinder and an extension on said casting protruding beneath the cylinder a short distance therefrom so as to support it when the bearing is removed.

4. In a support for a turbine head the combination of a tower, a plate removably secured to said tower, a journal bearing supported adjacent to but independently of said plate, a thrust bearing supported by said plate, a member carrying a turbine wheel, resting on said thrust bearing and within said journal bearing, and a ledge immediately beneath said member adapted to support it when the thrust bearing is removed.

5. In a support for a turbine head, the combination of a removable thrust bearing a member carrying the turbine head and a fixed support adapted to engage said member when the thrust bearing is removed.

6. In a wind turbine the combination of a tower, a vertical shaft supporting said tower, a horizontal shaft supporting the turbine wheel, gearing interconnecting said shafts, a casing surrounding said gearing, a plate closing the upper part of said casing on one side, bearings in said plate and said casing carrying the wheel shaft and a second plate closing the lower part of said casing.

7. In a support for a turbine head the combination of a tower of metal framework, a casting uniting the members of said tower at some distance from the top, a plate removably secured to the under side of said casting, a thrust bearing on said plate, a journal bearing supported in said casting, and a member adapted to rest normally upon the thrust bearing but alternatively upon the casting.

8. In a wind turbine the combination of a tower, a casing revolubly supported on said tower, a plate closing the upper part of said casing, a horizontal shaft carrying the turbine wheel, journal bearings in said plate and said casing supporting said shaft, thrust bearings on said plate preventing longitudinal motion of said shaft and a second plate closing the lower part of said casing.

9. In a support for a turbine head, the combination with a tower and metal framework, of a casting uniting the members of said tower at some distance from the top and having a cylindrical upward extension in the center expanded at the top, a plate removably secured to the under side of said casting, a journal bearing in its expanded cylindrical part, a thrust bearing upon the removable plate, a spherical seating resting on said thrust bearing, and a member of larger diameter than the unexpanded lower portion of the upward extension of the casting normally supported upon said thrust bearing and within said journal bearing.

10. In a wind turbine, the combination with a supporting tower of metal framework, of a casting uniting the members of said tower at the top and having an expanded top, a second casting uniting the members of said tower at some distance from the top and also having an expanded top, journal bearings in said members, and a cylinder mounted in said bearings and making expanded portions of the casting receptacles for oil.

11. In a wind turbine the combination with a sheet of corrugated metal forming a vane, of strengthening members on either side of said sheet, a supporting arm, a block secured to said arm, and to said vane, and a stay surrounding said block and attaching either side of it to said vane.

In testimony whereof I have signed my name to this specification in the presence of two subscribing witnesses.

JOSEPH GERSHOM CHILDS.

Witnesses:
LEONARD E. HAYNES,
H. D. JAMESON.

Copies of this patent may be obtained for five cents each, by addressing the "Commissioner of Patents, Washington, D. C."